United States Patent
Bowe et al.

(10) Patent No.: US 11,577,564 B2
(45) Date of Patent: Feb. 14, 2023

(54) TRI-BALL TRAILER COUPLER LOCK

(71) Applicant: Curt Manufacturing, LLC, Eau Claire, WI (US)

(72) Inventors: Curtis M. Bowe, Chippewa Falls, WI (US); Benjamin D. Fisher, Eau Claire, WI (US)

(73) Assignee: CURT Manufacturing, LLC, Eau Claire, WI (US)

( * ) Notice: Subject to any disclaimer, the term of this patent is extended or adjusted under 35 U.S.C. 154(b) by 289 days.

(21) Appl. No.: 16/908,372

(22) Filed: Jun. 22, 2020

(65) Prior Publication Data

US 2020/0398623 A1    Dec. 24, 2020

Related U.S. Application Data

(60) Provisional application No. 62/864,596, filed on Jun. 21, 2019.

(51) Int. Cl.
*B60D 1/60* (2006.01)
*E05B 73/00* (2006.01)

(52) U.S. Cl.
CPC ............ *B60D 1/60* (2013.01); *E05B 73/0005* (2013.01)

(58) Field of Classification Search
CPC ............................. B60D 1/60; E05B 73/0005
See application file for complete search history.

(56) References Cited

U.S. PATENT DOCUMENTS

| | | | | |
|---|---|---|---|---|
| 3,233,913 | A * | 2/1966 | Brown | B60D 1/60 280/480 |
| 4,509,770 | A * | 4/1985 | Young | B60D 1/60 D12/162 |
| 5,222,755 | A * | 6/1993 | O'Neal | B60D 1/60 280/507 |
| D356,763 | S * | 3/1995 | Herrick | D12/162 |
| 5,725,229 | A * | 3/1998 | McWethy | B60D 1/07 280/491.5 |
| 6,644,071 | B2 | 11/2003 | Gilbertson et al. | |
| D488,110 | S | 4/2004 | Borysenko | |
| 6,722,686 | B2 | 4/2004 | Koy | |
| 7,107,799 | B1 | 9/2006 | Marley et al. | |
| 7,121,121 | B2 | 10/2006 | Wyers | |
| 7,306,275 | B2 * | 12/2007 | Kalous | B60D 1/60 296/1.07 |
| 7,469,919 | B2 | 12/2008 | Kalous et al. | |
| 7,543,838 | B2 | 6/2009 | Jacques | |
| 8,020,885 | B2 | 9/2011 | Cuellar et al. | |
| 8,151,605 | B1 | 4/2012 | Gustafson | |
| 8,302,435 | B2 * | 11/2012 | Burmesch | B60D 1/02 70/34 |

(Continued)

*Primary Examiner* — Derek J Battisti

(74) *Attorney, Agent, or Firm* — Shewchuk IP Services, LLC; Jeffrey D. Shewchuk

(57) ABSTRACT

A tri-ball trailer hitch coupler lock has three differently sized ball substitute members. A lanyard extends in two directions off a portion which adjoins the ball substitute members, with mating portions of a lock permanently attached to each free end of the lanyard. One portion of the lock terminates in a pin sized to fit in the latch pin opening of the coupler, and the other portion of the lock is matably lockable onto the pin after the pin has been extended through the coupler pin opening. The lanyard preferably passes through an opening in the adjoinment portion offset from the center.

17 Claims, 8 Drawing Sheets

(56) References Cited

U.S. PATENT DOCUMENTS

| | | |
|---|---|---|
| 9,352,625 B2 | 5/2016 | Frantz |
| 10,549,589 B1* | 2/2020 | Burress .................. B60D 1/065 |
| 2015/0258866 A1* | 9/2015 | Frantz ..................... B60D 1/60 |
| | | 280/507 |
| 2018/0079266 A1* | 3/2018 | Cincunegui .............. B60D 1/07 |

* cited by examiner

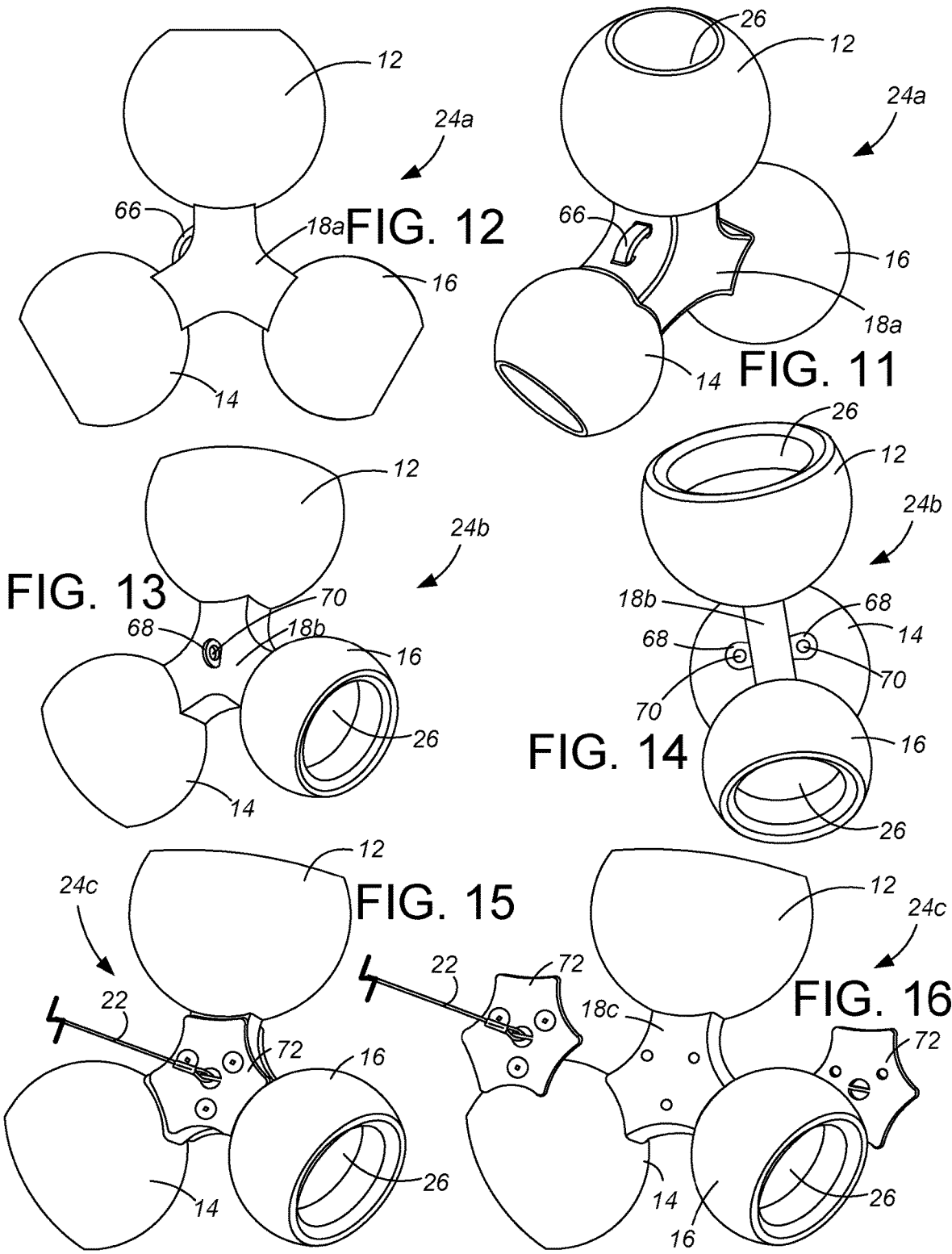

TRI-BALL TRAILER COUPLER LOCK

CROSS-REFERENCE TO RELATED APPLICATION(S)

The present application claims the benefit of U.S. provisional patent application Ser. No. 62/864,596, filed Jun. 21, 2019, entitled "Tri-ball Trailer Hitch Lock". The contents of U.S. provisional patent application Ser. No. 62/864,596 are hereby incorporated by reference in entirety.

BACKGROUND OF THE INVENTION

The present application relates locks for trailer hitches and similar equipment towable by a ball hitch. Trailers and many similar and other products are commonly towable by a towing vehicle using a ball hitch. The trailer commonly includes a coupler which extends around and/or over the ball mounted off the back of the towing vehicle. When the trailer or other equipment is not being towed, it is decoupled from the ball.

With ball hitches being so common, if left otherwise unlocked, it is relatively easy for a thief to couple his or her own towing vehicle with ball hitch to any unattended trailer. Thus, locks for trailer hitch couplers are common. Examples of such locks are shown in U.S. Pat. Nos. 3,233,913, 5,222,755, 6,644,071, D488,110 6,722,686, 7,107,799, 7,121,121, 7,543,838 and 7,469,919, 8,020,885, 8,151,605 and 9,352,625, all incorporated by reference for their teachings of trailer tongues and couplers used with towing balls. However, these various locks are expensive and lacking to various degrees.

One particular disadvantage—not readily apparent to many users until after the problem occurs—is that the hitch locks are usually sized for a single size of coupler, and thus cannot be used to lock any of several differently sized couplers which may be owned by the user. For instance, different hitch ball diameters of 1⅞ inch, 2 inch and 2 5/16 inch are all commonly used in the U.S., with couplers appropriately sized for the intended ball diameter. If a hitch lock is sized for a single size of coupler, then the user must know which size of hitch lock to purchase, increasing the rate of return of purchased hitch locks. And the user cannot later use the hitch lock for a different size should the user later change to a differently sized hitch ball. Another particular disadvantage of many of these solutions is that they are provided as multiple separate parts or used with a separate padlock, requiring the user to keep all the separate parts stored when not in use without losing any. The multiple parts then require the user to hold and assemble the multiple parts together for usage. Better trailer hitch coupler locks are needed.

SUMMARY OF THE INVENTION

The present invention is a trailer hitch coupler lock which preferably includes three hitch ball substitute members defining differently sized spheres, each extending from an adjoinment portion. Rather than using a separate lock such as a padlock, a lanyard extends in two directions off the adjoinment portion, with mating portions of a lock permanently attached to each free end of the lanyard. One portion of the lock terminates in a pin sized to fit in the latch pin opening of the coupler, and the other portion of the lock is matably lockable onto the pin after the pin has been extended through the coupler pin opening. The lanyard is long enough that any one of the three ball substitute members (whichever one is correctly sized for that particular coupler) can be positioned in the hitch ball receiving location of the coupler while the lock is secured through the coupler pin opening. When the coupler is actually being towed by a hitch ball, the trailer hitch coupler lock can still be used as a lock through the coupler pin opening, with the adjoined ball substitutes merely hanging downward below the coupler pin opening.

BRIEF DESCRIPTION OF THE DRAWINGS

The present invention is described with reference to the attached drawing sheets, in which:

FIG. 11 is a perspective view of a second preferred embodiment of a monolithic portion of a trailer hitch coupler lock in accordance with the present invention.

FIG. 12 is a side view of the second preferred monolithic portion of FIG. 11.

FIG. 13 is a perspective view of a third preferred embodiment of a monolithic portion of a trailer hitch coupler lock.

FIG. 14 is another perspective view of the third preferred monolithic portion of FIG. 13.

FIG. 15 is a perspective view of a fourth preferred embodiment of a trailer hitch coupler lock, showing only proximal end of one portion of the lanyard (with the lock (not depicted in FIG. 15) permanently attached on free distal ends of the lanyard).

FIG. 16 is a exploded perspective view of the fourth preferred embodiment of the trailer hitch coupler lock of FIG. 15.

Figure 1:
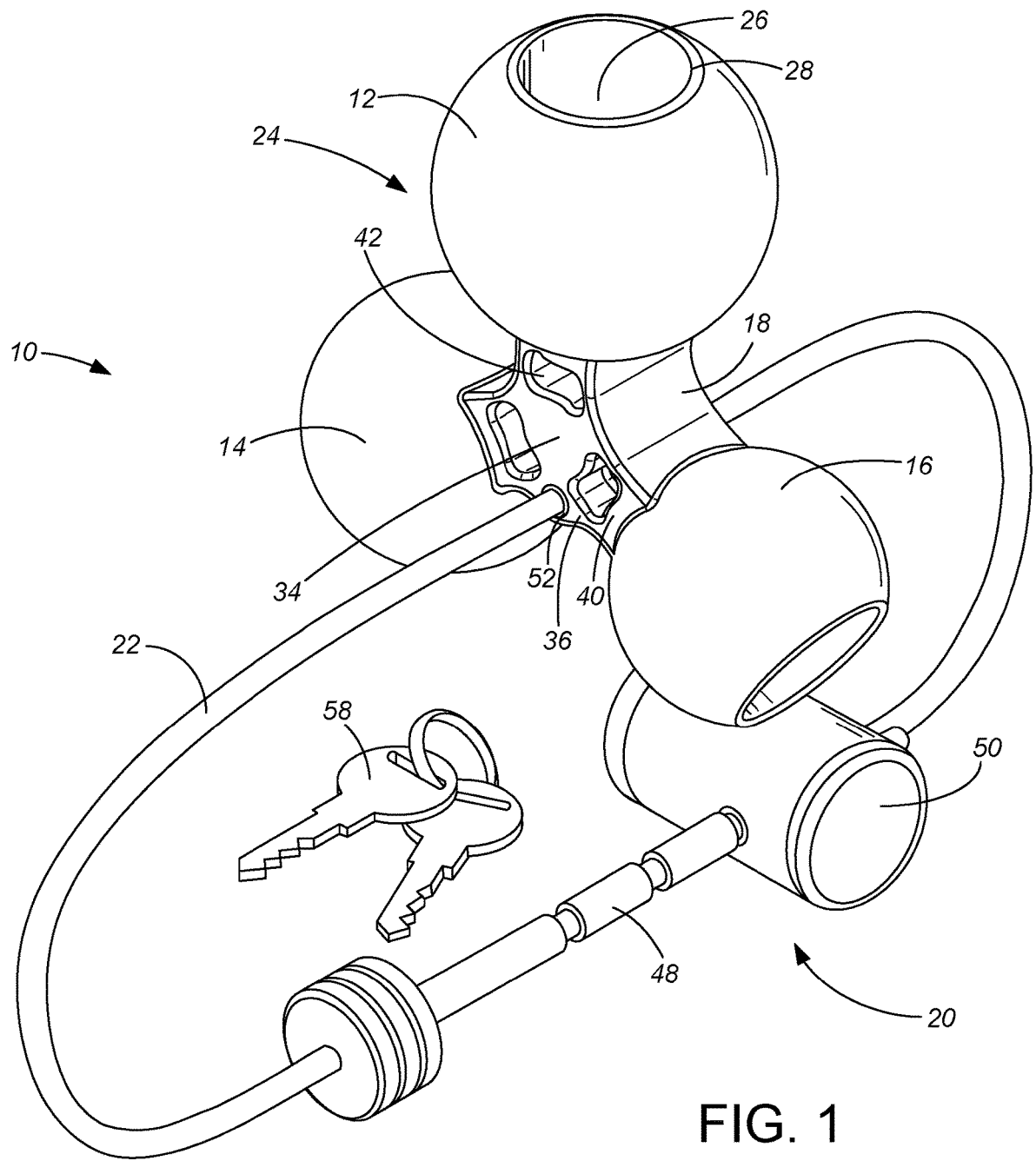
FIG. 1 is a perspective view of a first preferred embodiment of the present invention utilizing a key-openable lock, shown in a locked position.
Figure 2:
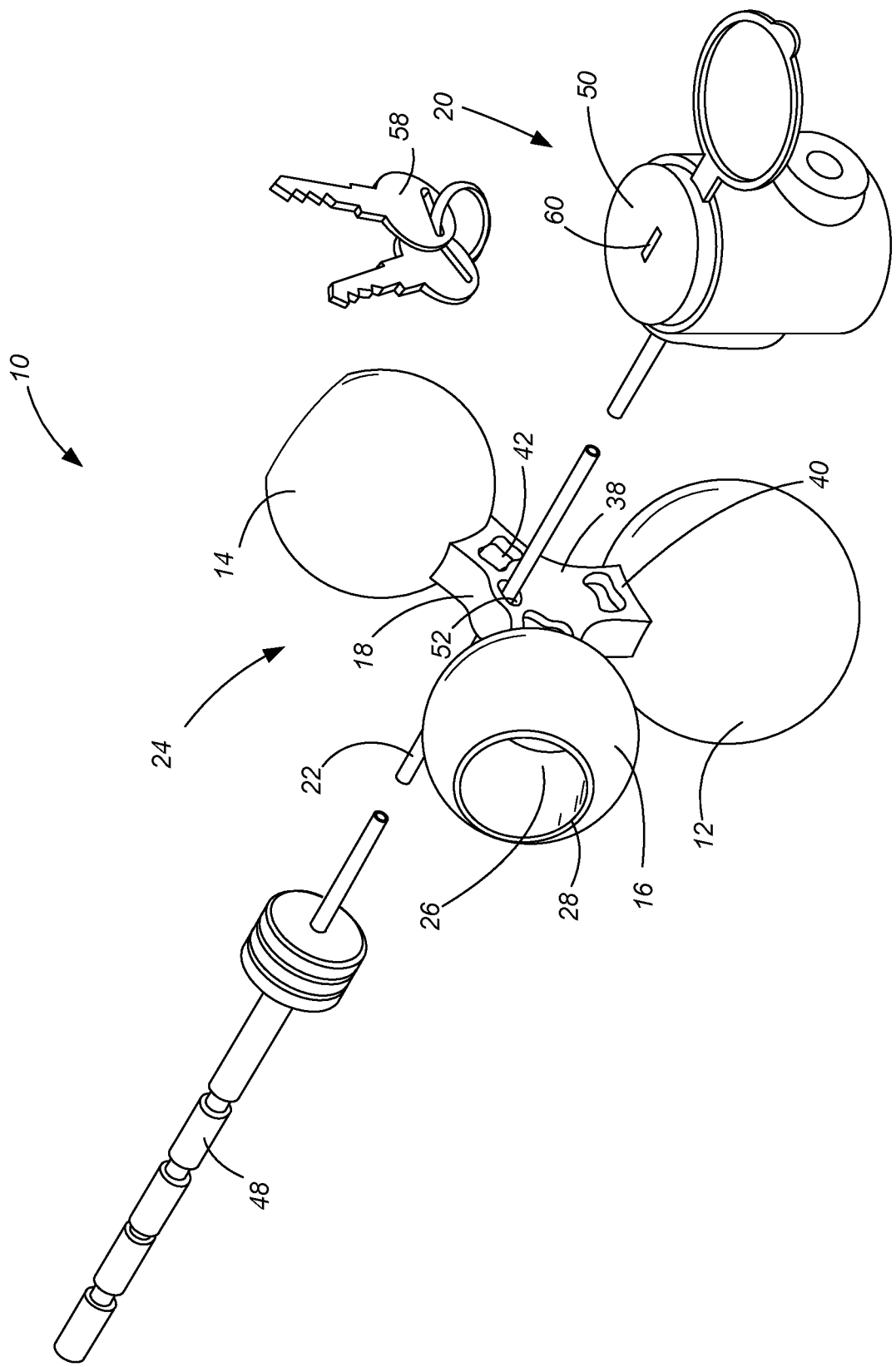
FIG. 2 is an opposite perspective view of the trailer hitch coupler lock of FIG. 1, shown in an unlocked position.
Figure 3:
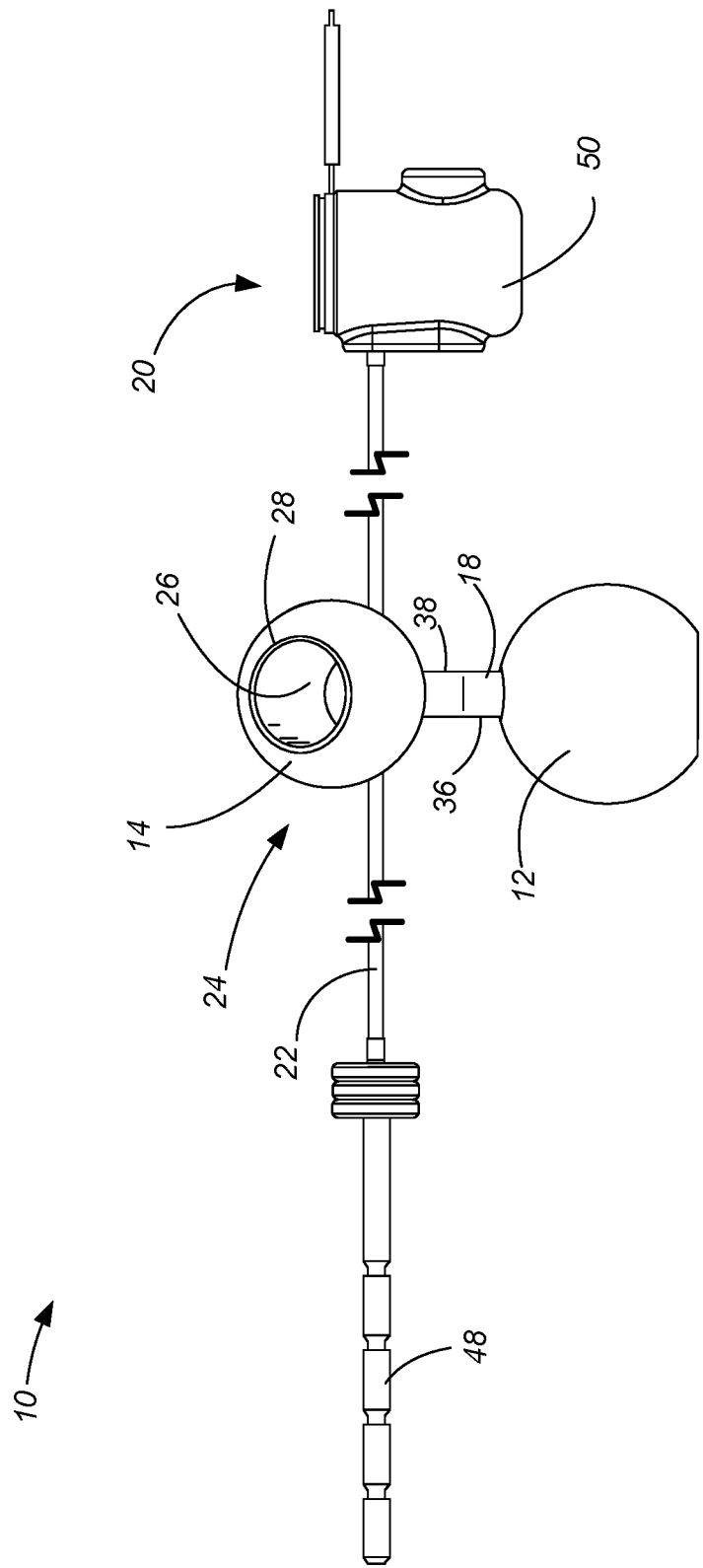
FIG. 3 is a side view of the trailer hitch coupler lock of FIGS. 1 and 2 (without the keys), shown in an unlocked position.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

The present invention is a trailer hitch coupler lock 10 with a most preferred embodiment detailed in FIGS. 1-7 of the drawings. The trailer hitch coupler lock 10 primarily includes a plurality of ball substitute members 12, 14, 16 which are joined together with an adjoinment portion 18 coupled to a lock 20 via a flexible lanyard 22. Preferably there are three ball substitute members 12, 14, 16. While it would be possible for the adjoinment portion to allow flexing or change of position of each of the ball substitute members relative to the others, the preferred embodiments have all the ball substitute members 12, 14, 16 and the adjoinment portion 18 integrally joined as a single, generally rigid, monolithic construct 24 which can be referred to as a "tri-ball". As one example, each of the ball substitute members could be metal spheres (such as from aluminum or steel), welded together (i.e., using the weld material to provide the adjoinment portion) or to a central adjoinment portion. In some other embodiments, the ball substitute members can be formed of another low cost rigid material, such as from wood. In the preferred embodiments, each of the ball substitute members 12, 14, 16 and the adjoinment portion 18 are formed by injection molding of polymer as a single part 24. Forming the ball substitute members 12, 14, 16 of polymer reduces weight and cost (costs of raw material as well as manufacturing/molding costs). The preferred polymer material can be glass-filled (such as nylon) for strength and rigidity, and molded in either an inconspicuous (such as gray or black) or more preferably conspicuous (such as orange) color to deter thieves from attempting or investigating a potential theft.

The three hitch ball substitute members 12, 14, 16 define differently sized spheres. The different diameters match the diameters of commonly used hitch balls for commonly used couplers. For instance, in the preferred embodiments, the largest ball substitute member 12 defines a spherical diameter of 2⁵⁄₁₆ inches, the middle ball substitute member 14 defines a spherical diameter of 2 inches, and the smallest ball substitute member 16 defines a spherical diameter of 1⅞ inches.

Figure 5:
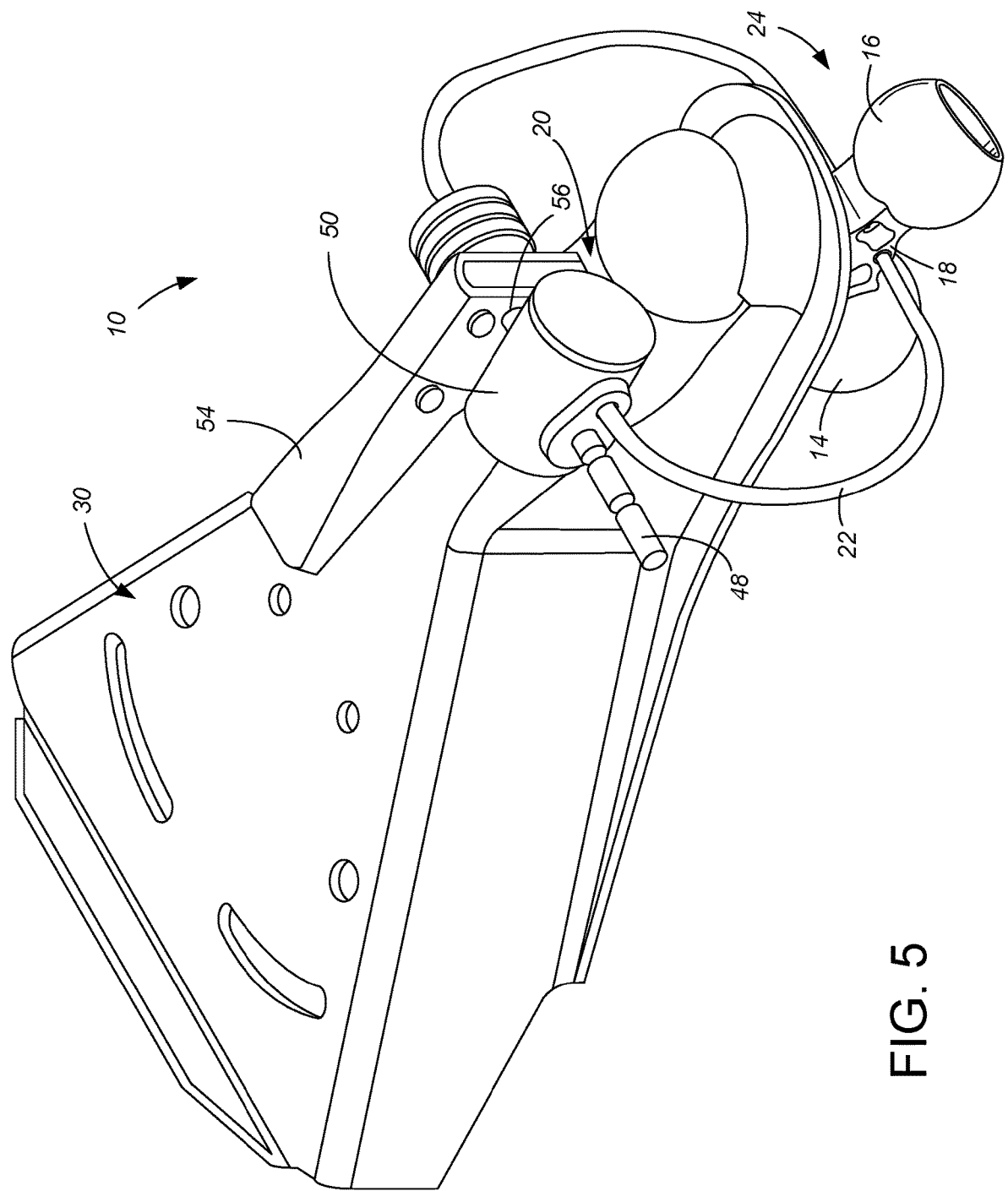
FIG. 5 is a perspective view of the trailer hitch coupler lock of FIGS. 1-4 in use in locking a standard coupler of a trailer.
Figure 6:
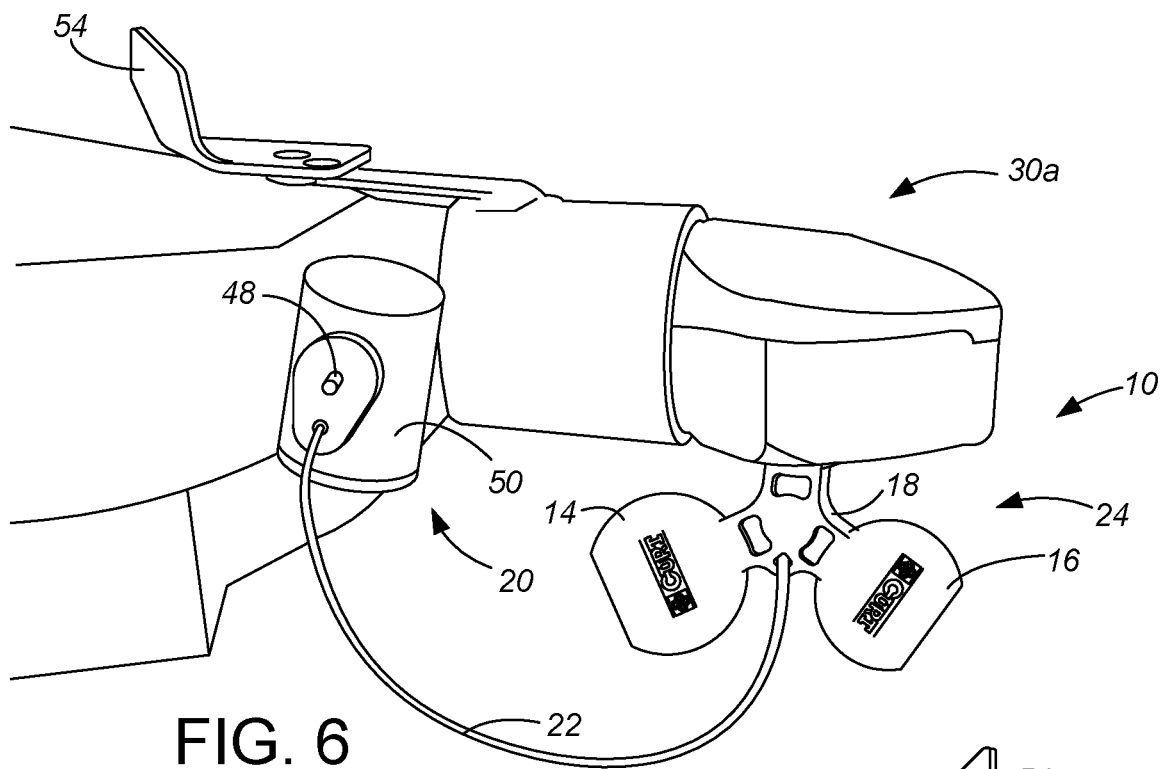
FIG. 6 is a perspective view of the trailer hitch coupler lock of FIGS. 1-5 in use in locking a different type of coupler of a trailer.

If desired, each of the ball substitute members can be solid. Alternatively, particularly depending upon the method of forming, each of the ball substitute members 12, 14, 16 can be hollow, thereby reducing weight and material cost. In the preferred embodiment formed by molding, each of the three ball substitute members 12, 14, 16 are cup-shaped with a hollow interior 26 and an opening 28. The position of the opening 28 matches the flat commonly found on ball hitches, i.e., when oriented with the opening 28 of any cup-shape at top, the bottom of the cup-shape of that ball substitute member is at bottom where it rigidly connects to the adjoinment portion 18. Regardless of whether formed to be solid, to be cup shaped, or to have other openings or recesses, the important consideration is that each ball substitute member 12, 14, 16 sufficiently define a sphere to replace the hitch ball 32 used with the coupler 30, 30a so the coupler 30, 30a can be locked around the appropriately sized ball substitute member 12, 14, 16. When so locked such as around the largest ball substitute member 12 as shown in FIGS. 5 and 6, the ball substitute member 12 prevents the coupler 30, 30a from being used by any other hitch ball 32, thereby preventing the trailer of the coupler 30, 30a from being towed using the coupler 30, 30a. While the diameter and depth of the cup recess 26 can be sized as appropriate for the strength and rigidity of the material used (with FIGS. 13-16 in particular showing wider diameter interiors 26), in the preferred embodiment the largest diameter ball substitute member 12 weighs more than the other two ball substitute members, 14, 16 with the smallest ball substitute member 16 weighing the least of the three.

The preferred adjoinment portion 18 allows a sufficient separation between the three ball substitute members 12, 14, 16 to avoid interference with the coupler 30, 30a from the other two ball substitute members when one of the ball substitute members is within the coupler 30, 30a. In the preferred embodiment, the adjoinment portion 18 defines a center 34, and each of the ball substitute members 12, 14, 16 are circumferentially spaced 120° about the center 34. In such a configuration, the centers of the three ball substitute members define a bisecting plane, which can be conveniently used as the parting line in forming a mold for the single monolithic piece 24. In the preferred embodiment, the center of the largest ball substitute member 12 is about 2 inches (50.4 mm) from the center 34 of the adjoinment portion 18, the center of the middle ball substitute member 14 is about 1⅜ inches (35 mm) from the center 34 of the adjoinment portion 18, and the center of the smallest ball substitute member 16 is about 1⅓ inches (33.8 mm) from the center 34 of the adjoinment portion 18. This spacing of the ball substitute members 12, 14, 16 not only provides sufficient clearance in use between the two non-used ball substitute members and the vast majority of couplers, but also provides a balanced look and feel to the adjoinment portion 18 and the monolithic part 24.

The adjoinment portion 18 is preferably shaped for convenient molding using the bisecting plane parting line and pull direction, such as having a first side 36 which is planar parallel to the bisecting plane and an opposing second side 38 which is planar parallel to the bisecting plane and equally spaced from the bisecting plane as the first side 36, providing a pleasing, balanced look and feel to the single monolithic part 24. In the most preferred embodiment, the adjoinment portion 18 has a thickness of about 0.945 inches (24 mm) between the two flat sides 36, 38. To provide sufficient rigidity and strength in the connection between the adjoinment portion 18 and each of the three ball substitute members, each arm 40 of the adjoinment portion 18 is about 0.71 inches (18 mm) wide. However, to reduce weight of the adjoinment portion 18, recesses 42 can be positioned in the arms 40, preferably in accordance with the mold pull direction. In the preferred embodiment, there are six such recesses 42, each of which is about 0.235×0.472 inches (6×12 mm) and about 0.315 (8 mm) deep. If a cross-section is taken through two of the six recesses 42 and transverse to the arm axis, the shape is essentially that of an I-beam supporting the ball substitute member on one of its ends.

Figure 4:
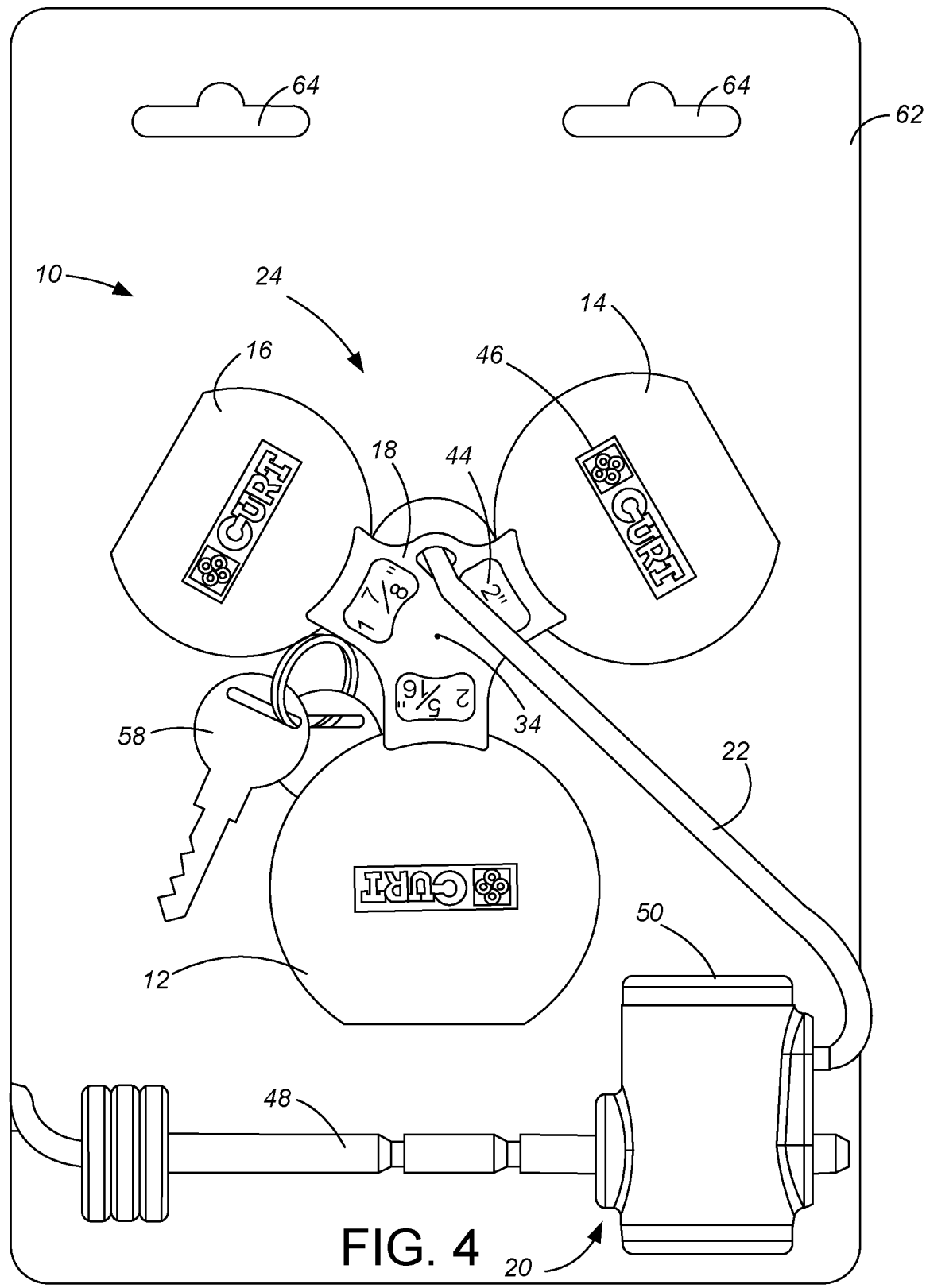
FIG. 4 is a side view showing the trailer hitch coupler lock of FIGS. 1-3 as packaged for a consumer display.

The coupler lock 10 can include indicia 44, 46 to indicate the size of the various diameters, as well as other information. For instance, the diameters 44 of the ball substitute members 12, 14, 16 can be molded as small recesses into the tri-ball component 24, as can other identifying information such as a trademark 46 of the manufacturer. As an alternative location as shown in FIG. 4, indicia could be placed at the bottom of each of the recesses 42, such as indicating the diameter of the associated ball substitute member. Recessing the indicia 44, 46 helps keep the identifying information from being marred, damaged or smudged during years of use of the coupler lock 10. Alternatively, such indicia could be printed onto the tri-ball component 24 or added as a printed sticker (not shown) adhered to the tri-ball component 24. However, injection molding indicia 44, 46 into the tri-ball component 24 allows the indicia 44, 46 to still be readable even after years of use, precipitation and weathering, road wear, etc.

Rather than using a separate lock such as a padlock, two portions of a lanyard 22 extend in two directions off the adjoinment portion 18, with mating portions 48, 50 of the lock 20 permanently attached to each free end of the lanyard 22. In the most preferred embodiment, the lanyard 22 is joined to the tri-ball component 24 by threading one of the ends of the lanyard 22 through a through-hole opening 52, prior to affixing one of the mating portions 48, 50 of the lock 20 onto that end of the lanyard 22. By threading the lanyard 22 through this opening 52, the tri-ball component 24 remains free to slide along the lanyard 22 and to spin relative to the lanyard 22. With the tri-ball component 24 being free to slide and spin relative to the lanyard 22, the possibility of having the tri-ball component 24 torque, twist or bind the lanyard 22 is essentially eliminated. The most preferred embodiment uses a single 30 inch long, ⅛ inch diameter, vinyl-coated steel cable for the lanyard 22, with the tri-ball 24 able to slide and spin relative to the length of the cable 22. By not fixing the cable 22 to the tri-ball 24 but still maintaining the attachment between the cable 22 and the tri-ball 24, the lanyard 22 is less likely to become twisted or kinked in use and locking of the lock pin 48 into the coupler latch 54 is easier. The through-hole opening 52 is sized only slightly larger than the diameter of the vinyl-coated steel cable 22.

Figure 7:
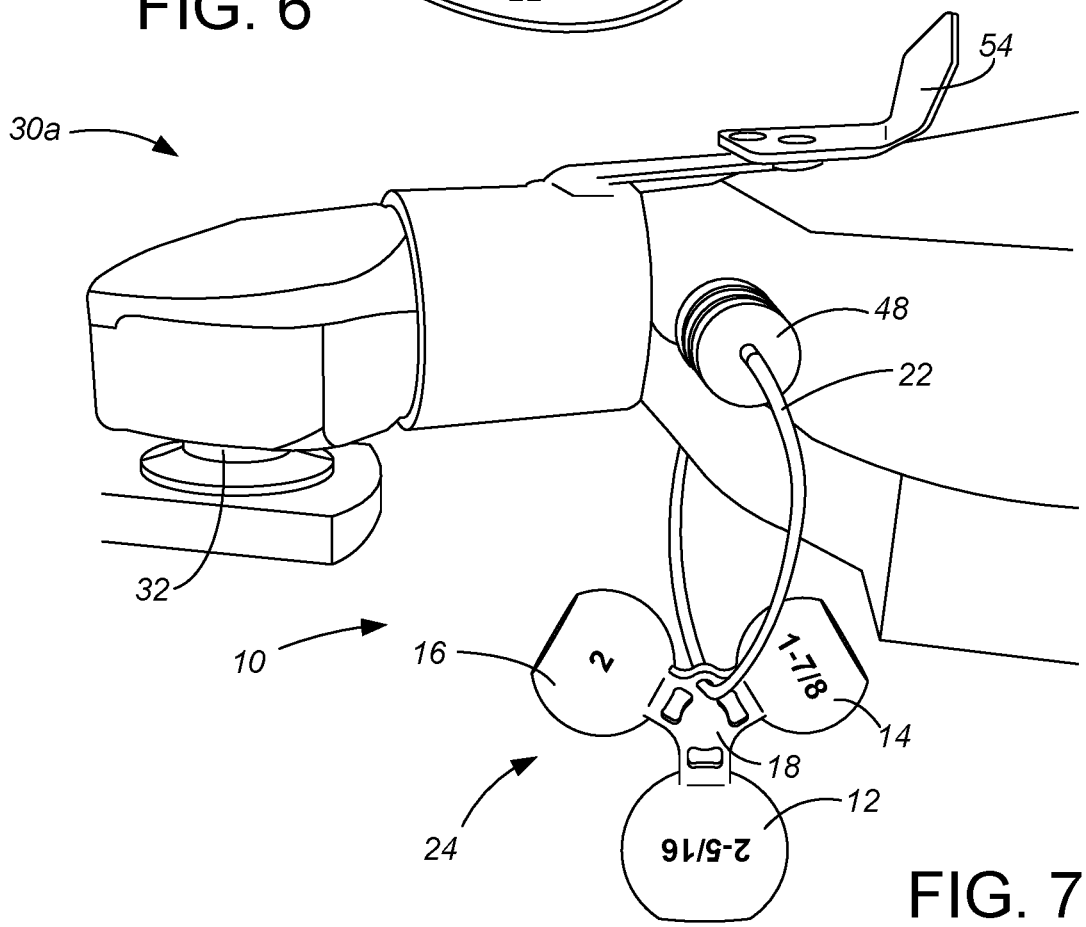
FIG. 7 is an opposite perspective view showing the trailer coupler of FIG. 6 while towing, with the lock being used to lock the coupler onto the towball and to simultaneously lock the trailer hitch coupler lock onto the trailer coupler.
Figure 8:
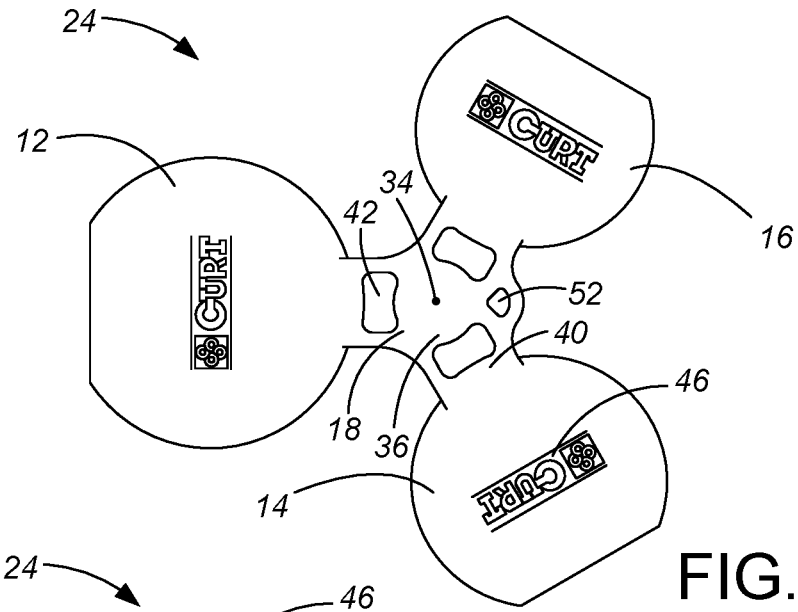
FIG. 8 is a front side view of the monolithic portion of the trailer hitch coupler lock of FIGS. 1-4, oriented with the largest ball substitute member facing toward the left.
Figure 9:
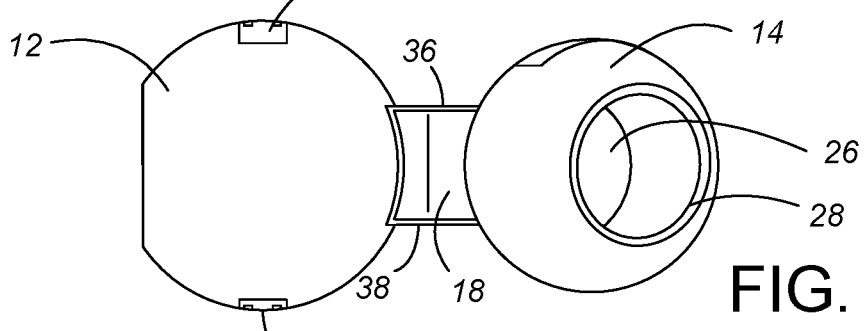
FIG. 9 is a right side view of the monolithic portion of FIG. 8.
Figure 10:
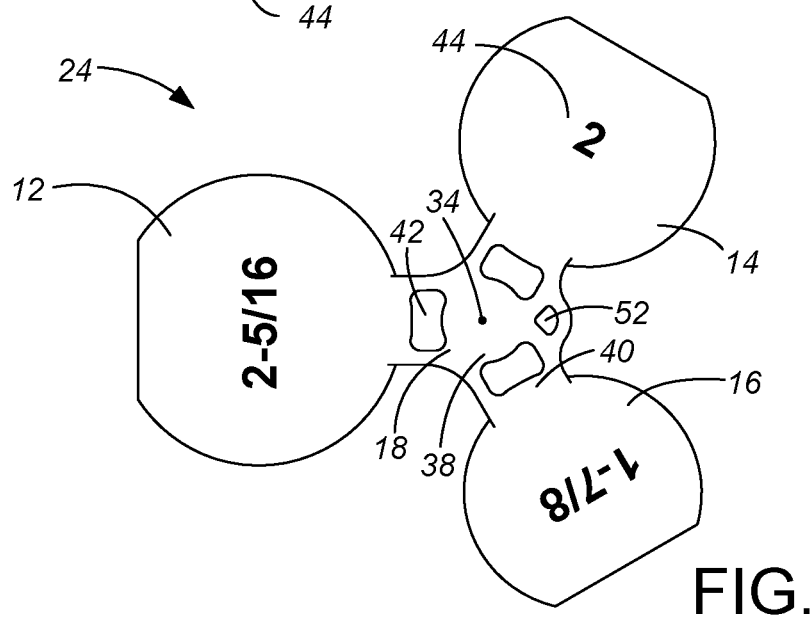
FIG. 10 is a rear side view of the monolithic portion of FIGS. 8 and 9.

One portion of the lock 20 terminates in a pin 48, sized to fit in the latch pin opening 56 of the coupler latch 54. As shown in FIGS. 5-7, the other portion 50 of the lock 20 is matably lockable onto the pin 48 after the pin 48 has been extended through the coupler pin opening 56. For instance, in the most preferred embodiment, the distal ends of the lanyard(s) 22 can each be connected to one of the two pieces of CURT Manufacturing LLC's existing two piece coupler lock sold as CURT part no. 23503. Both the lock portions 48, 50 are too large to fit through the through-hole opening 52, i.e., manufacturing assembly of the lock portions 48, 50 onto the lanyard 22, with at least one portion 48, 50 attached after the lanyard 22 has been threaded through the through-hole opening 52, permanently secures both lock portions 48, 50 to the tri-ball component 24. For instance, the ends of the lanyard 22 can be crimped onto the pin 48 and the lock assembly 50. By such a manufacturing assembly process, the entire coupler lock 10 (except for the keys 58) becomes a single unit; no portion of the trailer hitch coupler lock 10 can be removed from the remainder of the trailer hitch coupler lock 10 (without destruction of the trailer hitch coupler lock 10), thereby preventing for instance loss of one of the lock portions or loss of the tri-ball 24 should it become separated from the other parts during storage. The preferred two lock pieces 48, 50 of the coupler lock 10 can be unlocked/opened with either of two keys 58 sold as part of the product, either of which fit into the keyhole 60 of the lock assembly 50. As shown in FIG. 4, the product can be mounted onto a laminated/printed retail cardboard card 62, with openings 64 for display mounting as known in the art.

The lanyard 22 is long enough that any one of the three ball substitute members (whichever one is correctly sized for that particular coupler 30, 30a) can be positioned in the hitch ball receiving location of the coupler 30, 30a while the lock pin 48 is secured through the coupler pin opening 56. FIGS. 5 and 6 shows the coupler lock 10 in use, using the largest ball substitute member 12 to lock the coupler 30, 30a.

When the coupler 30a is actually being towed by a hitch ball 32 as shown in FIG. 7, the trailer hitch coupler lock 10 can still be used as a lock through the coupler pin opening 56, with the tri-ball 24 merely hanging downward below the coupler pin opening. The tri-ball trailer hitch coupler lock 10 can therefore be used not only when locking the untowed trailer (with the lock pin 48 extending through the closed coupler latch 54, thereby holding it closed about one of the balls 12, 14, 16 of the tri-ball 24), but also to lock the trailer to a towing vehicle hitch ball 32 with the tri-ball 24 hanging from its lanyard 22. Particularly when the tri-ball 24 is molded from a polymer, the tri-ball trailer hitch coupler lock 10 is inexpensive and lightweight, but elegantly solves the trailer locking problem.

The preferred lanyard 22 connects to the tri-ball 24 (i.e., the through-hole 52 is positioned) at a location which is offset from the vertical axis of at least two of the three ball substitute members 12, 14, 16, with the most preferred location being opposite the largest ball portion 12. As such, the location that the lanyard 22 connects to the tri-ball 24 is offset from and not transverse to or otherwise crossing the axes of the two smaller ball portions 14, 16. Due to this arrangement, when used to lock the trailer to a towing vehicle hitch ball 32 with the tri-ball 24 hanging from its lanyard 22 as shown in FIG. 7, the tri-ball 24 will characteristically hang with the larger, heavier ball 12 pointed straight downward. This helps reduce spinning of the tri-ball 24 when hanging from the lanyard 22 during vehicle travel and reduces wear between the tri-ball 24 and the lanyard 22. When used to lock the untowed trailer, the lanyard 22 will naturally tend to turn the two lower balls 14, 16 so they align with the trailer fore-aft direction. However, the two unused ball substitute members do not need to be aligned with the fore-aft direction.

FIGS. 11 and 12 show an alternative embodiment, which changes the way the tri-ball element is shaped for attaching the lanyard 22 (shown in FIGS. 1-7) to the tri-ball 24a. In the embodiment of FIGS. 11 and 12, an arch 66 is formed off the adjoinment portion 18a. During assembly, one end of the lanyard 22 is threaded through this arch 66.

FIGS. 13 and 14 show another alternative embodiment. In this embodiment, two metal inserts 68, each providing an eye-hole 70, are insert molded to extend off the sides of the adjoinment portion 18b. With two such inserts 68, each mating portion 48, 50 of the lock 20 (shown in FIGS. 1-7) has its own separate lanyard portion (such as 15 inches long, not shown in FIGS. 13-14 but a portion shown in FIGS. 15 and 16), which is looped through the eye-hole 70 prior to being secured to itself (such as shown in FIGS. 15 and 16). This configuration prevents sliding of the enjoinment portion 18b on the lanyard, and also minimizes rotation or spinning of the adjoinment portion 18b relative to the lock 20. The adjoinment portion 18b is formed without any recesses or I-beam shape, and the metal inserts 68 can add strength to the adjoinment portion 18b.

FIGS. 15 and 16 show yet another alternative embodiment, in which two lanyard end plates 72 are riveted to each other through the adjoinment portion 18c. This embodiment thus uses the lanyard end plates 72 to add strength similar to the inserts 68 of the adjoinment portion 18b of FIGS. 13 and 14, but the tri-ball component 24c can be molded without the added complexity of insert molding.

Although the present invention has been described with reference to preferred embodiments, workers skilled in the art will recognize that changes may be made in form and detail without departing from the spirit and scope of the invention.

What is claimed is:

1. A trailer hitch coupler lock comprising:
a first hitch ball substitute member rigidly defining a first spherical diameter,
a second hitch ball substitute member rigidly defining a second spherical diameter different from the first spherical diameter;
a third hitch ball substitute member rigidly defining a third spherical diameter different from the first spherical diameter and different from the second spherical diameter;
an adjoinment portion connecting the first hitch ball substitute member, the second hitch ball substitute member and the third hitch ball substitute member such that any one of the first hitch ball substitute member, the second hitch ball substitute member and the third hitch ball substitute member can be inserted as a substitute in place of a hitch ball into a trailer hitch coupler but none of the first hitch ball substitute member, the second hitch ball substitute member, the third hitch ball substitute member nor the adjoinment portion can be received in a hitch for use in towing a trailer;
a first portion of a lock attached on a free end of a first flexible lanyard portion extending off the adjoinment portion, the first portion of the lock being receivable in a coupler pin opening; and
a second portion of a lock attached on a free end of a second flexible lanyard portion extending off the adjoinment portion, the second portion of the lock being matably lockable with the first portion of the lock after the first portion of the lock has been extended through the coupler pin opening.

2. The trailer hitch coupler lock of claim 1, wherein the first hitch ball substitute member, the second hitch ball substitute member, the third hitch ball substitute member and the adjoinment portion are all integrally formed as a single monolithic rigid part.

3. The trailer hitch coupler lock of claim 2, wherein the single monolithic rigid part is injection molded out of polymer.

4. The trailer hitch coupler lock of claim 3, wherein each of the first hitch ball substitute member, the second hitch ball substitute member, and the third hitch ball substitute member are cup-shaped with a hollow interior and an opening, each when oriented with the opening of the cup-shape at top having a bottom of the cup-shape rigidly connected to the adjoinment portion.

5. The trailer hitch coupler lock of claim 3, wherein indicia are molded into at least one ball substitute member of the single monolithic rigid part.

6. The trailer hitch coupler lock of claim 2, wherein the first flexible lanyard portion and the second flexible lanyard portion are each provided by a single vinyl coated steel cable received in an opening of the adjoinment portion, with the adjoinment portion being slidable relative to the vinyl coated steel cable, and with the first and second portions of the lock each being too large to fit through the opening.

7. The trailer hitch coupler lock of claim 6, wherein first spherical diameter is larger than the second spherical diameter and larger than the third spherical diameter, with the first hitch ball substitute member weighing more than the second hitch ball substitute member and weighing more than the third hitch ball substitute member, and wherein the opening is offset from a center of the adjoinment portion opposite from the first hitch ball substitute member, such that, if hanging from the vinyl coated steel cable, the single monolithic rigid part will gravitationally hang with the first hitch ball substitute member downward so as to resist spinning on the vinyl coated steel cable.

8. The trailer hitch coupler lock of claim 1, wherein the first portion of the lock can be unlocked from the second portion of the lock with a key.

9. The trailer hitch coupler lock of claim 1, wherein the adjoinment portion has a first side and a second side opposite to the first side, the first side and the second side defining a bisecting plane, wherein centers of the first spherical diameter, the second spherical diameter and the third spherical diameter are all on the bisecting plane.

10. The trailer hitch coupler lock of claim 9, wherein the first side is planar, wherein the second side is planar and parallel to the first side, and wherein the centers of the first hitch ball substitute member, the second hitch ball substitute member, and the third hitch ball substitute member are all circumferentially spaced 120° about a center of the adjoinment portion.

11. The trailer hitch coupler lock of claim 9, wherein the first spherical diameter is larger than the second spherical diameter, wherein the second spherical diameter is larger than the third spherical diameter, wherein the adjoinment portion defines a center, wherein the center of the first spherical diameter is further from the center of the adjoinment portion than the center of the second spherical diameter is from the center of the adjoinment portion, and wherein the center of the second spherical diameter is further from the center of the adjoinment portion than the center of the third spherical diameter is from the center of the adjoinment portion.

12. The trailer hitch coupler lock of claim 1, wherein the first spherical diameter is 2 5/16 inches, wherein the second spherical diameter is 2 inches, and wherein the third spherical diameter is 1 7/8 inches.

13. The trailer hitch coupler lock of claim 1, wherein the first spherical diameter is larger than the second spherical diameter, wherein the second spherical diameter is larger than the third spherical diameter, wherein the adjoinment portion receives the first flexible lanyard portion and the second flexible lanyard portion at locations-offset from a center of the adjoinment portion and opposite from the first hitch ball substitute member.

14. A trailer hitch coupler lock comprising:
a first hitch ball substitute member rigidly defining a first spherical diameter;
an adjoinment portion rigidly and permanently extending from the first hitch ball substitute member such that the first hitch ball substitute member can be inserted as a substitute in place of a hitch ball into a trailer hitch coupler but neither the first hitch ball substitute member nor the adjoinment portion can be received in a hitch for use in towing a trailer;
a first portion of a lock permanently secured on a free end of a first flexible lanyard portion permanently extending off the adjoinment portion, the first portion of the lock being receivable in a coupler pin opening; and
a second portion of a lock permanently secured on a free end of a second flexible lanyard portion permanently extending off the adjoinment portion, the second portion of the lock being matably lockable with the first portion of the lock after the first portion of the lock has been extended through the coupler pin opening;
wherein no portion of the trailer hitch coupler lock can be removed from the remainder of the trailer hitch coupler lock without destruction of the trailer hitch coupler lock.

15. A trailer hitch coupler lock comprising:
- a plurality of hitch ball substitute members, each hitch ball substitute member being receivable as a substitute in place of a hitch ball within a trailer hitch coupler;
- an adjoinment portion rigidly attaching the plurality of hitch ball substitute members together;
- a flexible lanyard having two free ends, each end extending off a side of the adjoinment portion, with the flexible lanyard being received in an opening of the adjoinment portion such that the adjoinment portion is slidable relative to the flexible lanyard;
- a first portion of a lock permanently secured on one free end of the flexible lanyard, the first portion of the lock being receivable in a coupler pin opening; and
- a second portion of a lock permanently secured on the other free end of the flexible lanyard, the second portion of the lock being matably lockable with the first portion of the lock after the first portion of the lock has been extended through the coupler pin opening;
- wherein no portion of the trailer hitch coupler lock can be removed from the remainder of the trailer hitch coupler lock without destruction of the trailer hitch coupler lock.

16. The trailer hitch coupler lock of claim 15, wherein the plurality of hitch ball substitute members comprise a first hitch ball substitute member, a second hitch ball substitute member and a third hitch ball substitute member, with centers of the first hitch ball substitute member, the second hitch ball substitute member, and the third hitch ball substitute member all circumferentially spaced 120° about a center of the adjoinment portion, and wherein the first hitch ball substitute member, the second hitch ball substitute member, the third hitch ball substitute member and the adjoinment portion are all integrally formed as a single monolithic rigid part.

17. The trailer hitch coupler lock of claim 16, wherein the center of the first hitch ball substitute member has a different spacing from the center of the adjoinment portion than the center of the second hitch ball substitute member has from the center of the adjoinment portion, with the opening of the adjoinment portion being offset from a center of the adjoinment portion such that, if hanging from the flexible lanyard, the single monolithic rigid part will gravitationally hang with the first hitch ball substitute member downward so as to resist spinning on the flexible lanyard.

* * * * *